United States Patent
Wu

(10) Patent No.: US 7,576,649 B2
(45) Date of Patent: Aug. 18, 2009

(54) ANTI-THEFT ALARM SYSTEM FOR PORTABLE COMPUTER

(75) Inventor: Lei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 12 days.

(21) Appl. No.: 11/309,535

(22) Filed: Aug. 18, 2006

(65) Prior Publication Data

US 2007/0075856 A1    Apr. 5, 2007

(30) Foreign Application Priority Data

Sep. 12, 2005    (CN)    ............ 200510037285

(51) Int. Cl.
  *G08B 13/14*    (2006.01)
(52) U.S. Cl. .................................. 340/568.1
(58) Field of Classification Search ........ 340/505, 340/568.1, 571, 384.6, 384.7, 539.11, 540, 340/541, 539.31, 539.32; 116/4, 6, 75, 77; 190/101, 102
See application file for complete search history.

(56) References Cited

U.S. PATENT DOCUMENTS

| 4,985,695 | A | * | 1/1991 | Wilkinson et al. | ........ 340/568.3 |
| 5,578,991 | A | * | 11/1996 | Scholder | ..................... 340/571 |
| 5,936,526 | A | | 8/1999 | Klein | |
| 6,133,830 | A | * | 10/2000 | D'Angelo et al. | ........... 340/571 |
| 6,172,607 | B1 | * | 1/2001 | McDonald | ................. 340/571 |
| 6,294,995 | B1 | * | 9/2001 | Patterson | .................... 340/571 |
| 7,026,933 | B2 | * | 4/2006 | Kim | ........................ 340/568.1 |

* cited by examiner

*Primary Examiner*—Jennifer Mehmood
(74) *Attorney, Agent, or Firm*—Wei Te Chung

(57) ABSTRACT

An anti-theft alarm system for a portable computer, the anti-theft alarm system includes a controller, a button for delivering an anti-theft enabling signal to the controller, and a motion sensor enabled when the controller receives the anti-theft enabling signal and providing a detection signal indicating unauthorized movement of the portable computer, the controller providing an alarm control signal to an audio portion when it receives the detection signal, the audio portion producing an audible sound for a theft deterrence effect when it receives the alarm control signal.

12 Claims, 2 Drawing Sheets

ANTI-THEFT ALARM SYSTEM FOR PORTABLE COMPUTER

CROSS-REFERENCE TO RELATED APPLICATION

Reference is made to the U.S. patent application entitled "ANTI-THEFT ALARM SYSTEM FOR PORTABLE COMPUTER," filed on Sep. 22, 2006 with application Ser. No. 11/309,763, and assigned to the same assignee as that of the present invention.

FIELD OF THE INVENTION

The present invention relates to an alarm system, and particularly to an anti-theft alarm system for a portable computer.

DESCRIPTION OF RELATED ART

Portable computers, as opposed to desktop computers, provide benefits to their users in direct proportion to their small size. Technology has expanded to allow small laptops and notebooks and even smaller palm-sized or hand-held portable computers. The benefits of small size allow portable computers to be carried from place to place with a minimum of effort while taking up very little room in backpacks or briefcases.

As portable computers are made smaller and lighter, they are also made easier to conceal. The fact that these computers are easy to transport and conceal leads to an increase in the amount of theft of such systems. Portable computers are generally stolen by people who may see one lying unattended and simply pick it up and place it in their briefcase.

What is needed, therefore, is an anti-theft alarm system for a portable computer which can provide a sounding of an alarm upon unauthorized movement of the portable computer from a stationary position.

SUMMARY OF THE INVENTION

An anti-theft alarm system for a portable computer is provided. In a preferred embodiment, the method includes a controller, a button for delivering an anti-theft enabling signal to the controller, and a motion sensor enabled when the controller receives the anti-theft enabling signal and providing a detection signal indicating unauthorized movement of the portable computer, the controller providing an alarm control signal to an audio portion when it receives the detection signal, the audio portion producing an audible sound for a theft deterrence effect when it receives the alarm control signal. It is of advantage that the anti-theft alarm system uses existing components of the computer for the controller and the audio portion, economizes the design cost of the anti-theft alarm system, and achieves a theft deterring effect for the portable computer.

Other advantages and novel features will become more apparent from the following detailed description when taken in conjunction with the accompanying drawings, in which:

DETAILED DESCRIPTION OF THE INVENTION

Figure 1:
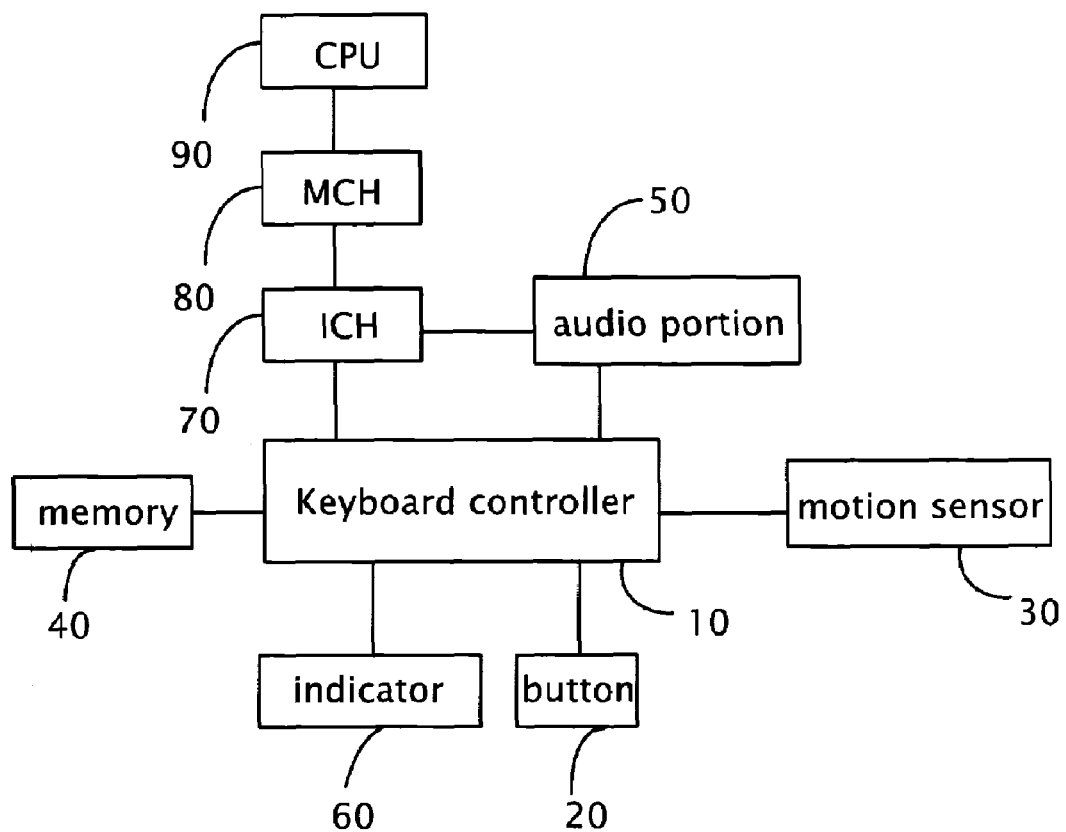
FIG. 1 is a schematic diagram of an anti-theft alarm system for a portable computer, in accordance with a preferred embodiment of the present invention.

FIG. 1 shows an anti-theft alarm system for a portable computer, in accordance with a preferred embodiment of the present invention. The anti-theft alarm system includes a keyboard controller (KBC) 10, an enable/disable button 20, a motion sensor 30, and a memory 40, an audio portion 50, a light emitting diode (LED) indicator 60, an input/output controller hub (ICH) 70, a memory controller hub (MCH) 80, a central processing unit (CPU) 90.

The button 20 is connected to a general purpose wake up pin of the KBC 10, for delivering an anti-theft enable or disable signal to the KBC 10. The button 20 can be a key of a keyboard of the portable computer suitably configured and programmed. The motion sensor 30 is connected to the KBC 10, for detecting unauthorized movement of the portable computer from a stationary position and providing a detection signal to the KBC10. The memory 40 is used to store data processed by the KBC 10, e.g. a user password be input to the portable computer for disabling the alarm system. The indicator 60 is connected to a general-purpose input/output pin of the KBC10, for indicating whether the alarm system is enabled or not. When the alarm system is disabled, the indicator 60 is unlit. When the alarm system is enabled, the indicator 60 is lit. While the alarm system is enabled, if unauthorized movement is detected, the indicator 60 blinks. The KBC 10 is connected to the CPU 90 via the ICH 70 and the MCH 80. The audio portion 50 is also connected to the CPU 90 via the ICH 70 and the MCH 80.

Figure 2:
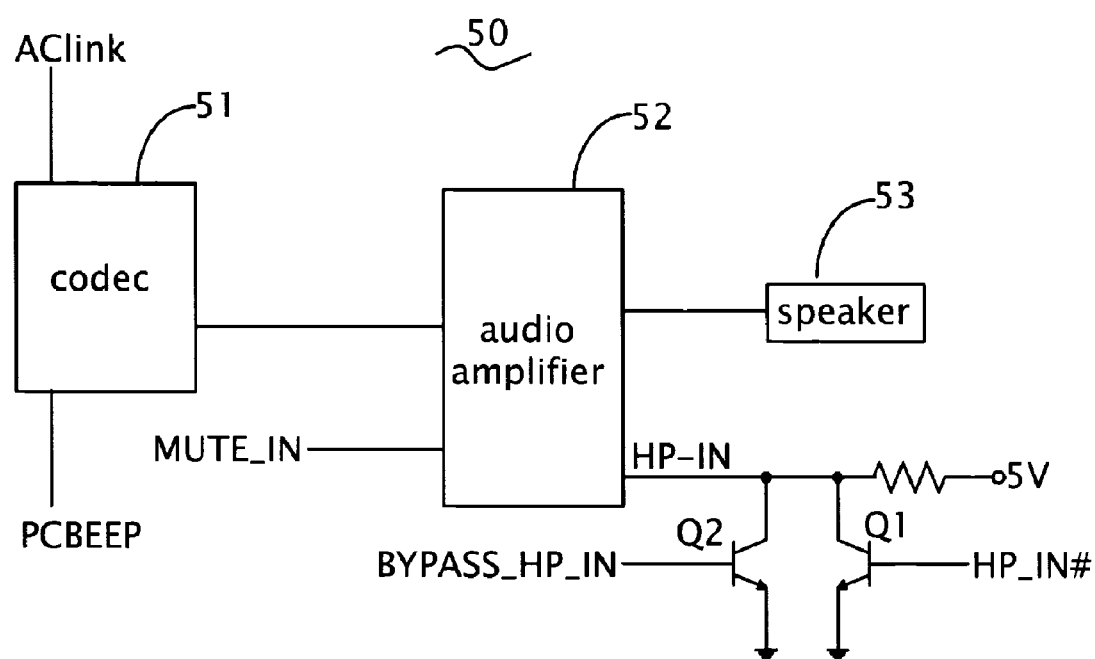
FIG. 2 is a schematic diagram of an audio portion of FIG. 1, in accordance with a preferred embodiment of the present invention.

As shown in FIG. 2, the audio portion 50 is an existing system of the portable computer. The audio portion 50 includes an AC97 codec 51, an audio amplifier 52, a speaker 53, and transistors Q1, Q2. The KBC 10 provides an alarm-controlling signal PCBEEP to the audio portion 50 when the KBC 10 receives the detection signal. The codec 51 is connected to the ICH 70 via an AC-link interface. Collectors of the transistors Q1, Q2 are connected to an earphone input HP-IN of the audio amplifier 52. Emitters of the transistors Q1, Q2 are connected to ground. A base of the transistor Q1 is used for receiving an earphone interface input HP-IN#. A base of the transistor Q2 is used for receiving an earphone bypass input BYPASS-HP-IN from the KBC 10. The speaker 53 sounds an alarm only if the earphone input HP-IN of the audio amplifier 52 is at a low level.

When the anti-theft enabling signal is input to the KBC 10 by pressing the button 20, an operating system, e.g. Windows or Linux, stores a status of a system volume control, a basic input/output system (BIOS) maximizes the system volume, the KBC 10 outputs a mute-disabling signal MUTE-IN to the audio amplifier 52 for disabling a possible mute status of the audio portion 50, the KBC 10 sets an anti-theft function enable flag in a register of the KBC 10, and the KBC 10 enables the motion sensor 30 to detect unauthorized movement of the portable computer.

Once the portable computer is moved without authorization (i.e. without input of a correct password), the motion sensor 30 provides the detection signal to the KBC10. Then the KBC10 outputs the alarm control signal PCBEEP to the codec 51, which converts the alarm control signal PCBEEP to an analog audio signal. Meanwhile the CPU 90 calls an audio driver. The audio amplifier 52 amplifies the analog audio signal and causes the speaker 53 to output maximum system volume. The KBC 10 also provides a high-level earphone bypass input BYPASS-HP-IN to the base of the transistor Q2 in order to make the earphone input HP-IN of the audio amplifier 52 at a low level. Therefore even if an earphone is plugged in to the portable computer at a time of unauthorized movement, the earphone interface input HP-IN# is at a low level, and the speaker 53 can still sound an alarm.

To disable the anti-theft alarm function, the button 20 is pressed again. The anti-theft disable signal is input to the KBC 10. A dialogue box asking for a password pops up on a display of the computer. When a correct password is input, the anti-theft function enable flag in the register of the KBC 10 is cleared. Then the motion sensor 30 stops detecting movement and the computer resumes a normal state.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An anti-theft alarm system for a portable computer, the anti-theft alarm system comprising:
    a controller;
    a button for delivering an anti-theft enabling signal to the controller;
    a transistor; and
    a motion sensor for detecting unauthorized movement of the portable computer from a stationary position and sending a detection signal to the controller, the controller sending an alarm control signal to an audio portion when the detection signal is received, the audio portion producing an audible sound for a theft deterrence effect when the alarm control signal is received,
    wherein in response to receipt of a detecting signal, the controller outputs a mute-disabling signal to the audio portion for disabling a possible mute status of the audio portion,
    wherein the audio portion comprises:
    a speaker;
    a codec for converting the alarm control signal to an analog audio signal; and
    an audio amplifier for amplifying the analog audio signal to make the speaker sound an alarm, the transistor includes a collector connected to an earphone input of the audio amplifier, and a base receiving an earphone bypass input from the controller for making the speaker sound the alarm even if an earphone is plugged into the portable computer.

2. The anti-theft alarm system as claimed in claim 1, further comprising a central processing unit connected to the audio portion via a memory controller hub and an input/output controller hub (ICH) for calling an audio driver when the controller outputs the alarm control signal.

3. The anti-theft alarm system as claimed in claim 1, further comprising a memory connected to the controller for storing a password to be input to the portable computer for disabling the alarm system.

4. The anti-theft alarm system as claimed in claim 1, further comprising an indicator connected to the controller for indicating whether the alarm system is enabled or not.

5. An anti-theft alarm system for a portable computer, the anti-theft alarm system comprising:
    a controller for producing an alarm control signal;
    a button connected to the controller for enabling an anti-theft function setting of the controller;
    a motion sensor connected to the controller for detecting an unauthorized movement of the portable computer;
    a transistor; and
    an audio portion connected to the controller for receiving the alarm control signal and producing an audible sound for a theft deterrence effect, wherein
    the audio portion comprises:
    a speaker;
    a codec for converting the alarm control signal to an analog audio signal; and
    an audio amplifier for amplifying the analog audio signal to make the speaker sound an alarm;
    wherein the controller outputs a mute-disabling signal to the audio amplifier for disabling a possible mute status of the audio portion, the transistor includes a collector connected to an earphone input of the audio amplifier, and a base receiving an earphone bypass input from the controller for making the speaker sound the alarm even if an earphone is plugged into the portable computer.

6. The anti-theft alarm system as claimed in claim 5, further comprising a central processing unit connected to the audio portion via a memory controller hub (MCH) and an input/output controller hub (ICH) for calling an audio driver when the controller outputs the alarm control signal.

7. The anti-theft alarm system as claimed in claim 5, further comprising a memory connected to the controller for storing a password to be input to the portable computer for disabling the alarm system.

8. The anti-theft alarm system as claimed in claim 5, further comprising an indicator connected to the controller for indicating whether the alarm system is enabled or not.

9. A portable computer comprising:
    a central processing unit; and
    an anti-theft alarm system provided within the computer comprising:
    a controller;
    a button connected to the controller for delivering an anti-theft enabling signal to the controller;
    a motion sensor connected to the controller for detecting an unauthorized movement of the portable computer and sending a detection signal to the controller;
    an audio portion connected to the controller for receiving an alarm control signal from the controller and producing an audible sound for a theft deterrence effect; and
    a memory connected to the controller for storing a password, the controller stopping providing the alarm control signal when the correct password is input to the portable computer; and
    a transistor; wherein
    the central processing unit is connected to the audio portion for calling an audio driver when the controller outputs the alarm control signal;
    the audio portion comprises:
    a speaker;
    a codec for converting the alarm control signal to an analog audio signal; and
    an audio amplifier for amplifying the analog audio signal to make the speaker sound an alarm;
    wherein the transistor comprises a collector connected to an earphone input of the audio amplifier, and a base receiving an earphone bypass input from the controller for making the speaker sound the alarm even if an earphone is plugged into the portable computer.

10. The portable computer as claimed in claim 9, wherein the controller outputs a mute-disabling signal to the audio amplifier for disabling a possible mute status of the audio portion.

11. The anti-theft alarm system as claimed in claim 9, wherein the central processing unit is connected to the audio portion via a memory controller hub (MCH) and an input/output controller hub (ICH).

12. The portable computer as claimed in claim 9, further comprising an indicator connected to the controller for indicating whether the alarm system is enabled or not.

* * * * *